(12) United States Patent
Zhu et al.

(10) Patent No.: US 8,357,462 B2
(45) Date of Patent: Jan. 22, 2013

(54) BATTERY SAFETY VENT AND BATTERY WITH THE SAME

(75) Inventors: Jianhua Zhu, Shenzhen (CN); Qing Lai, Shenzhen (CN); Wenya Pi, Shenzhen (CN); Luxia Jiang, Shenzhen (CN)

(73) Assignee: BYD Company Limited, Shenzen (CN)

( * ) Notice: Subject to any disclaimer, the term of this patent is extended or adjusted under 35 U.S.C. 154(b) by 0 days.

(21) Appl. No.: 13/282,647

(22) Filed: Oct. 27, 2011

(65) Prior Publication Data

US 2012/0040215 A1 Feb. 16, 2012

Related U.S. Application Data

(63) Continuation of application No. PCT/CN2010/071729, filed on Apr. 13, 2010.

(30) Foreign Application Priority Data

Apr. 30, 2009 (CN) .................. 2009 2 0131253 U

(51) Int. Cl.
*H01M 2/12* (2006.01)
(52) U.S. Cl. ............................. 429/56; 429/53
(58) Field of Classification Search ............ 429/56
See application file for complete search history.

(56) References Cited

U.S. PATENT DOCUMENTS

| 6,444,348 | B1 * | 9/2002 | Saijo et al. ........................ 429/53 |
| 2006/0263676 | A1 * | 11/2006 | Chang et al. ...................... 429/74 |
| 2009/0162737 | A1 | 6/2009 | Lai et al. |
| 2009/0311583 | A1 * | 12/2009 | Wu ................................ 429/82 |

FOREIGN PATENT DOCUMENTS

| CN | 2704119 | 6/2005 |
| CN | 201156559 | 11/2008 |
| CN | 201408794 | 2/2010 |
| JP | 7169452 | 7/1995 |
| JP | 2007-287624 | 11/2007 |

OTHER PUBLICATIONS

International Preliminary Report on Patentability dated Nov. 1, 2011, for PCT Application No. PCT/CN2010/071729.
International Search Report mailed Jun. 24, 2010, for PCT Application No. PCT/CN2010/071729.

* cited by examiner

*Primary Examiner* — Barbara Gilliam
*Assistant Examiner* — Gary Harris
(74) *Attorney, Agent, or Firm* — Finnegan, Henderson, Farabow, Garrett & Dunner, LLP

(57) ABSTRACT

The present invention disclosed a battery safety vent comprising: an explosion-proof film fixed on a battery cover plate, a safety vent cover covering the explosion-proof film and having a pressure release aperture, and an explosion-proof pin disposed on top of the safety vent cover, in which a free head of the pin is blunt and points to the explosion-proof film. The present invention further disclosed a battery having the above battery safety vent.

16 Claims, 4 Drawing Sheets

BATTERY SAFETY VENT AND BATTERY WITH THE SAME

CROSS-REFERENCE TO RELATED APPLICATIONS

The present application is a continuation of International Application No. PCT/CN2010/071729, filed Apr. 13, 2010, designating the United States of America, which claims priority to Chinese Patent Application No. 200920131253.7, filed Apr. 30, 2009, the entirety of both of which are hereby incorporated by reference.

FIELD OF THE INVENTION

The present invention generally relates to the field of battery safety, and more particularly to an explosion-proof safety vent device and a battery with the same.

DESCRIPTION OF THE RELATED ART

With enhancement of human's environmental consciousness, electric vehicles (EV) and hybrid electric vehicles (HEV) are becoming an inevitable trend for substituting conventional vehicles. Power battery groups as a core power source of the electric vehicles have become more and more important.

The power battery carried in a vehicle needs to have great rate performance and safety performance, and the main safety issue of the battery is to prevent explosions under abominable conditions. To avoid explosions, an explosion-proof structure is normally added to the battery. The power battery needs to have high self capacity, which requires a large battery volume and a thick battery shell. In this case, the conventional method of forming indentation on the shell may not satisfy the explosion-proof requirement. Although an explosion-proof structure with a metal film welded on the battery cover plate may be simple to manufacture with low cost, the starting pressure of a battery with such a structure is unstable.

SUMMARY

The present invention is directed to solve the problem of delayed pressure releasing and to provide a safety vent with improved pressure releasing ability.

In one aspect of the present disclosure, there is provided a battery safety vent comprising: an explosion-proof film fixed on a battery cover plate; a safety vent cover covering the explosion-proof film and having a pressure release aperture; and an explosion-proof pin disposed at a top of the safety vent cover, in which a free head of the pin is blunt and points to the explosion-proof film.

In another aspect, there is provided a battery comprising an electric core, a shell housing the electric core, a cover plate disposed on an end surface of the shell and formed with a gas release aperture; and a battery safety vent described above, disposed on the cover plate and around the gas release aperture.

The safety vent helps to timely release the pressure without pressure releasing delay. When the internal pressure of the battery reaches certain level, the explosion-proof film swells towards the explosion-proof pin and then gets in contact with the free head of the explosion-proof pin. With further increase of the battery internal pressure, the internal stress of the explosion-proof film grows under the continued pressure from the free head. When the stress exceeds the stress limit of the safety vent, the safety vent will break in large scales to release the battery internal pressure.

DETAILED DESCRIPTION OF THE EMBODIMENTS

Figure 1:
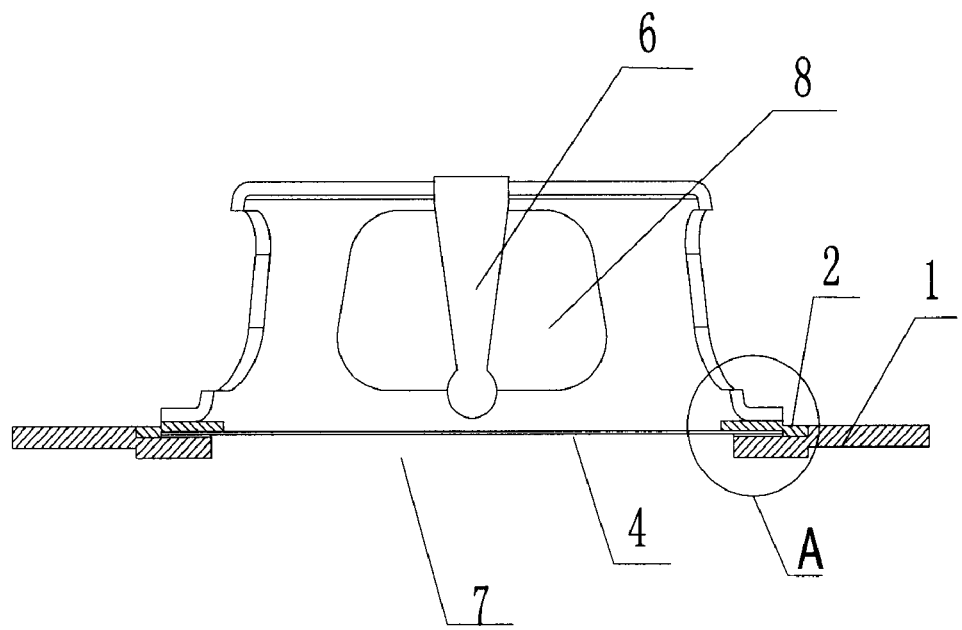
FIG. 1 is a schematic section view showing the connection of a safety vent and a cover plate of the battery according to Embodiment 1.

Reference will be made in detail to embodiments of the present disclosure. The embodiments described herein are explanatory, illustrative, and used to generally understand the present disclosure. The embodiments shall not be construed to limit the present disclosure.

A battery safety vent according to some embodiments of the present disclosure will be described. The battery safety vent comprises an explosion-proof film fixed on a battery cover plate, and a safety vent cover. The safety vent cover covers the explosion-proof film, and is formed with a pressure release aperture. An explosion-proof pin is disposed on top of the safety vent cover, and the free head of the explosion-proof pin is blunt and points to the explosion-proof film.

The blunt free head has a smooth surface, and will contain certain contact area with the explosion-proof film during work which can break the explosion-proof film. The free head may have a flat, spherical, ellipsoidal or wave shape.

In some embodiments of the present disclosure, to fix the explosion-proof film and the safety vent cover on the battery cover plate, an explosion-proof base is provided and disposed around the external periphery of a gas release aperture on the battery cover plate, and the explosion-proof film is fixed on the explosion-proof base.

In some embodiments of the present disclosure, the explosion-proof base has a ring structure; for example, it may be a round ring, an elliptical ring, a square ring, a triangle ring or other ring structures. In some embodiments of the present disclosure, the explosion-proof base is a round ring.

There is no special limit to the material of the explosion-proof base. In some embodiments of the present disclosure, the material of the explosion-proof base is preferably identical with that of the cover plate, such as stainless steel or aluminum.

In some embodiments of the present disclosure, the inner side of the bottom of the explosion-proof base is formed with a groove for disposing the explosion-proof film, and the width of the groove is about 50-90%, and preferably 70-80%, of that of the explosion-proof base ring.

The explosion-proof film is used to cover the gas release aperture on the cover plate of the battery, and to separate the internal portion of the battery from the safety vent so as to form two pressure systems. The explosion-proof film may be directly fixed on the battery cover plate, or it may be fixed on the explosion-proof base.

The explosion-film may be fixed using any kinds of method, for example, welding (such as laser welding, electronics beam welding, and ultrasonic wave welding), adhering, and riveting. In some embodiments of the present disclosure, the explosion-proof film is fixed by welding.

There is no limit to the shape of the explosion-proof film. It may be circular, square, elliptical or other shapes. When the explosion-proof film is fixed on the explosion-proof base, the shape of the explosion-proof film is adapted to that of the explosion-proof base. In some embodiments of the present disclosure, the explosion-proof film is circular.

The explosion-proof film may be made of metal foil or plastic. In some embodiments of the present disclosure, the explosion-proof film is made of metal foil. More preferably, the explosion-proof film is made of copper foil or stainless steel foil.

The thickness of the explosion-proof film is about 0.005-0.5 mm, and preferably 0.005-0.02 mm. The thickness of the explosion-proof film may be selected based on different starting breaking pressures.

In some embodiments of the present disclosure, the safety vent further comprises an explosion-proof pressing ring that presses on the explosion-proof film so as to secure the explosion-proof film and to improve the air tightness. Especially, when the explosion-proof film is made of stainless steel by welding, the explosion-proof pressing ring will reduce the operational difficulty of welding.

In some embodiments of the present disclosure, the shape and size of the explosion-proof pressing ring are adapted to those of the edge of the explosion-proof film.

When the explosion-proof film is fixed on the explosion-proof base, the explosion-proof pressing ring is located underneath the explosion-proof film. Because the groove for depositing the explosion-proof film is formed at the bottom portion of the explosion-proof base, during fixation, the explosion-proof base needs to be turned upside down, and the pressing ring presses on and fixes the explosion-proof film.

When the explosion-proof film is directly fixed on the cover plate, the explosion-proof pressing ring is located above the explosion-proof film.

In some embodiments of the disclosure, the safety vent cover is fixed on the explosion-proof base. The bottom shape of the safety vent cover is adapted to that of the explosion-proof base.

The height of the safety vent cover may be adjusted within a range according to the exhausting area and space.

In some embodiments of the disclosure, on the top and the side surfaces of the safety vent there are formed with a plurality of pressure release apertures. To timely release the pressure when the battery is in abnormal situations, the total area of the pressure release apertures is no less than that of the gas release aperture on the battery cover plate.

The top surface of the safety vent cover has an insert hole, and the explosion-proof pin is fixed in the insert hole. The insert hole may or may not penetrate through the top surface of the safety vent cover.

There is a relatively small distance between the free head of the explosion-proof pin and the explosion-proof film, so that they do not contact with each other under normal conditions.

The explosion-proof pin may be made of various metals. In some embodiments of the present disclosure, it is made of stainless steel or steel with nickel plating.

The free head of the explosion-proof pin is not a prong, but blunt. In some embodiments of the present disclosure, the free head of the explosion-proof pin is spherical or flat.

When the explosion-proof film is circular and the free head of the explosion-proof pin is spherical, the radius ratio of the free head to the explosion-proof film is about 1:7-1:10.

The free head of the explosion-proof pin has hard particles disposed thereon. The size of the hard particles is 50-500 mesh, and preferably about 100-300 mesh. The size of the hard particles is decided based on different requirements of the explosion-proof pressure.

The shape, hardness and size of the hard particles on the free head of the explosion-proof pin can be adjusted to provide a wide range of starting explosion pressures of the safety vent. The starting pressure increases with the size of the hard particles.

The free head of the explosion-proof pin is strong enough and will not be easily broken during work or turnover. The manufacturing process is thus easy to control and the yield rate is high.

As a result of the manufacturing process, the distance between the free head and the explosion-proof film in each battery may vary in a small range. If the free head is a prong, even the variation of the distance in a small range will have a big effect on the starting explosion pressure. With the blunt free head according to the present disclosure, the starting pressure is mainly affected by the internal stress, and the effect of the small range variation of the distance is limited, thus improving the consistency of the starting pressure of the safety vent.

According to another aspect of the present disclosure, a battery is provided comprising an electric core, a shell housing the electric core, a cover plate disposed on an end surface of the shell and formed with a gas release aperture, and a battery safety vent mentioned above disposed on the cover plate and around the gas release aperture.

A welding groove is formed on the cover plate around the periphery of the gas release aperture for disposing and welding the safety vent. The periphery diameter of the groove is about 0.01-0.2 mm, and preferably 0.01-0.05 mm, greater than that of the explosion-proof base.

The present disclosure will be further explained in conjunction with the detailed embodiments and with reference to the drawings.

Embodiment 1

As shown in FIG. 1, a battery comprises an electric core, a shell, a cover plate 1 and a safety vent. The electric core is housed in the shell, and the cover plate 1 is disposed on an end surface of the shell. The cover plate 1 is formed with a gas release aperture 7 and a welding groove around the edge of the gas release aperture 7. The safety vent is welded in the welding groove on the cover plate 1.

The safety vent comprises an explosion-proof base 2, an explosion-proof pressing ring 3, an explosion-proof film 4, a safety vent cover 5 and an explosion-proof pin 6.

The explosion-proof base 2 is welded in the welding groove on the cover plate 1, and is a stainless steel base having a ring shape.

A groove is formed at the inner side of the bottom portion of the explosion-proof base 2. The width of the groove is about 70% of that of the explosion-proof base 2.

The explosion-proof film 4 is welded in the above groove on the explosion-proof base 2, and is made of stainless steel foil with a thickness of about 0.01 mm. The explosion-proof film 4 is round, and its shape and size are adapted to those of the groove.

The explosion-proof pressing ring 3 presses on the edge of the explosion-proof film 4, and is welded on the explosion-proof film 4. The explosion-proof pressing ring 3 is made of stainless steel, and the shape and size thereof are adapted to those of the edge of the explosion-proof film 4.

The safety vent cover 5 is a hollow cylinder welded on the explosion-proof base 2. The bottom shape of the safety vent cover 5 is adapted to that of the explosion-proof base 2.

The top and side surfaces of the safety vent cover 5 are formed with a plurality of pressure release apertures 8, and the total area of the pressure release apertures 8 is 1.5 times of that of the gas release hole 7 on the cover plate 1.

A round insert hole is formed in the center of the top portion of the safety vent cover 5, and the explosion-proof pin 6 is welded in the insert hole. The free head of the explosion-proof pin 6 faces downwards in a manner that a certain distance is reserved between the free head of the explosion-proof pin 6 and the explosion-proof film 4.

The explosion-proof pin 6 has a spherical free head, and the radius ratio of the spherical free head to the explosion-proof film is 1:9. The explosion-proof pin 6 has diamond particles with a size of 200 mesh disposed on the free head.

Embodiment 2

Figure 2:
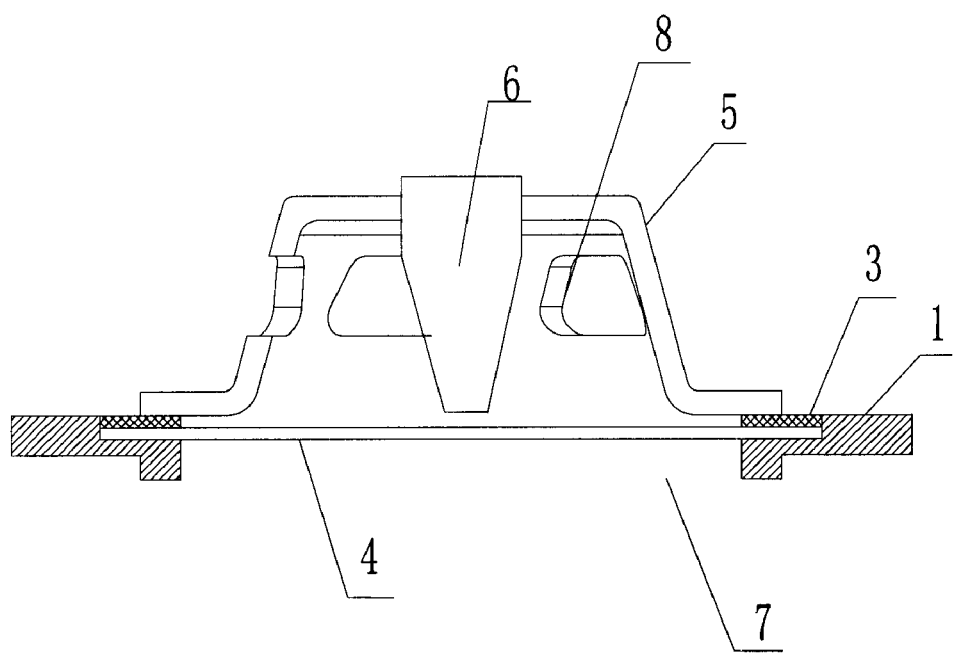
FIG. 2 is a schematic section view showing the connection of a safety vent and a cover plate of the battery according to Embodiment 2.
Figure 3:
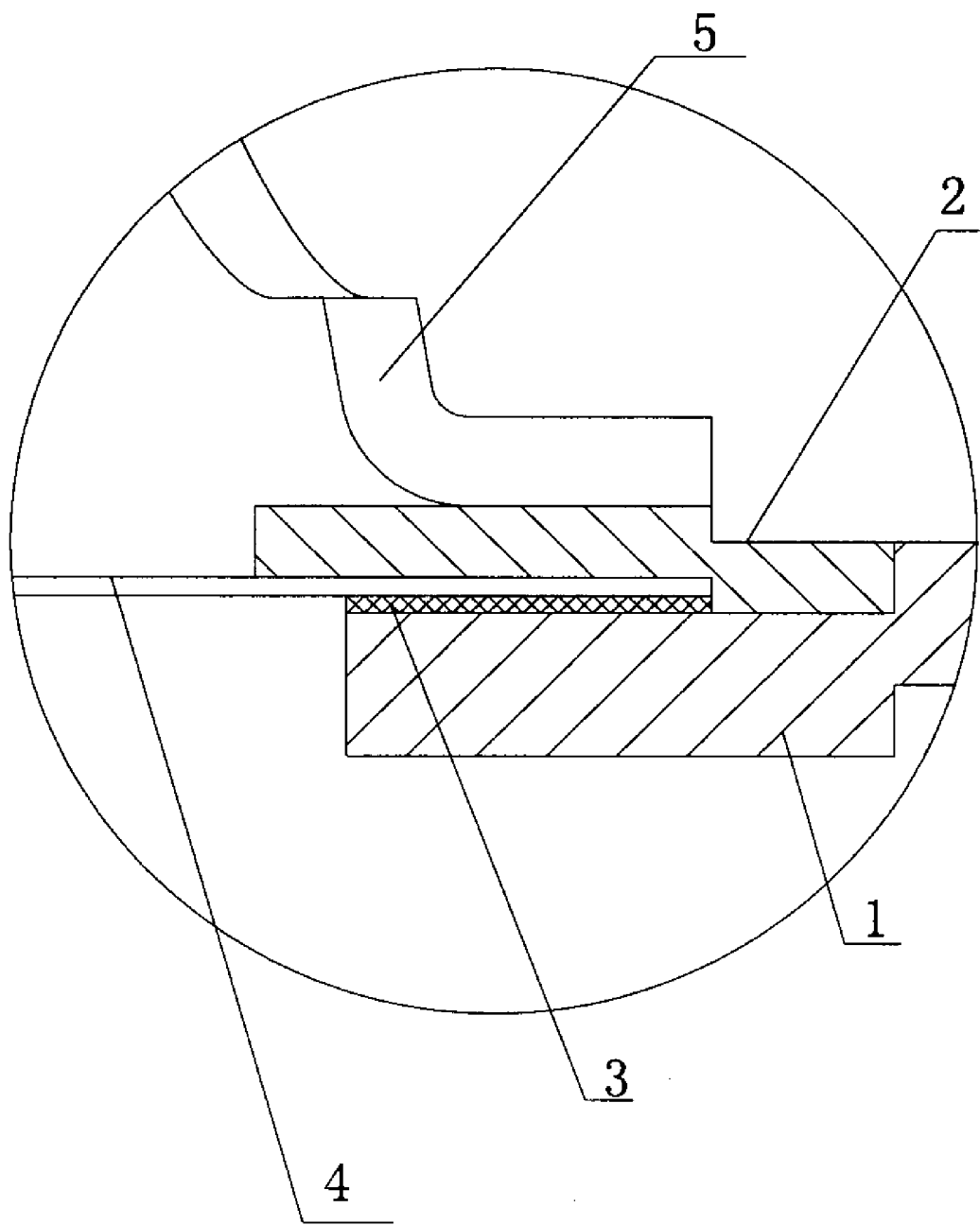
FIG. 3 is a partial and enlarged view of part A in FIG. 1.
Figure 4:
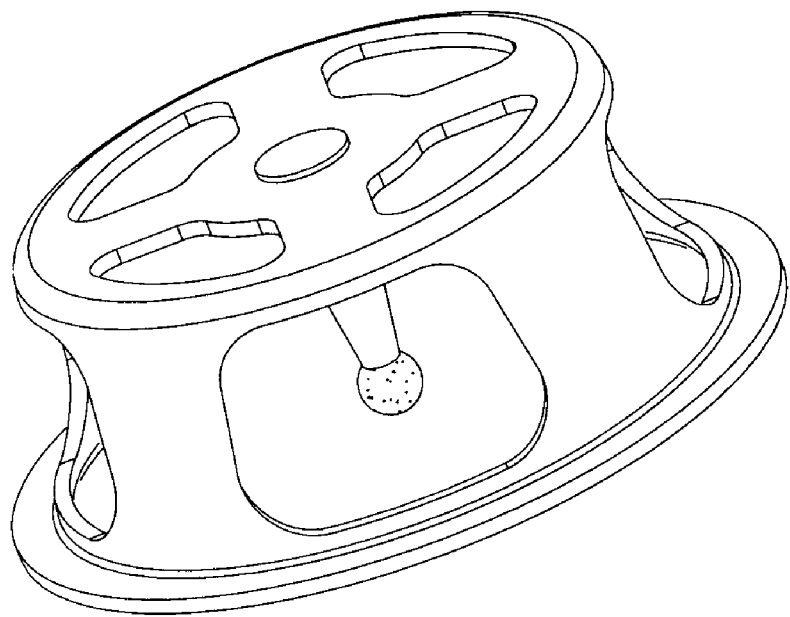
FIG. 4 is a perspective view of a safety vent in an embodiment of the disclosure.
Figure 5:
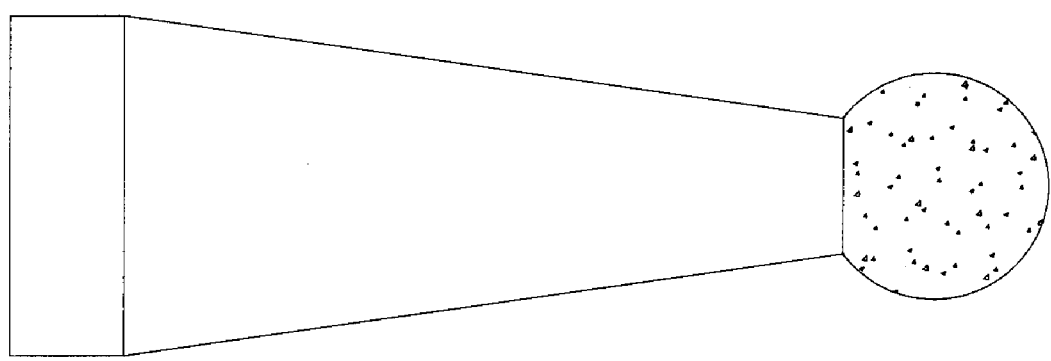
FIG. 5 is a schematic view of an explosion-proof pin with a spherical free head in an embodiment of the disclosure.
Figure 6:
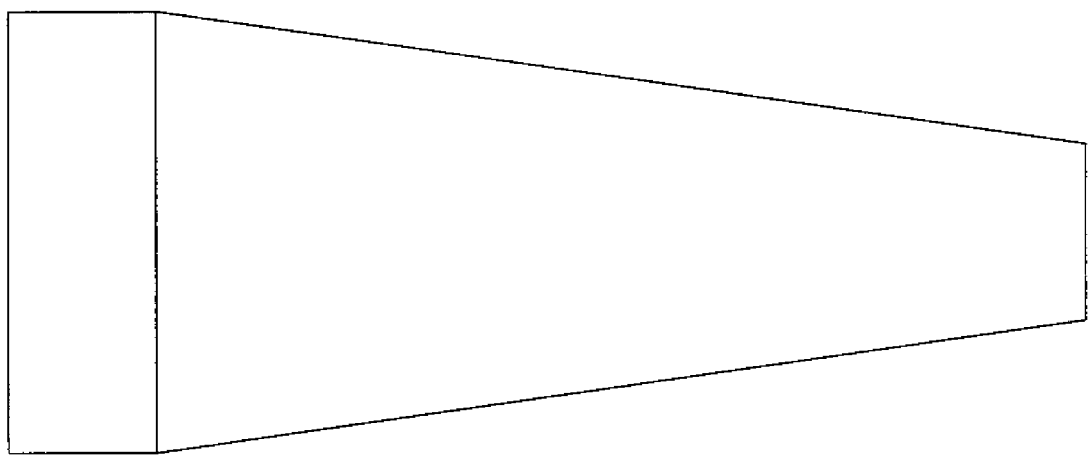
FIG. 6 is a schematic view of an explosion-proof pin with a flat and circular head in an embodiment of the disclosure.

As shown in FIG. 2, a battery safety vent comprises an explosion-proof pressing ring 3, an explosion-proof film 4, a safety vent cover 5 and an explosion-proof pin 6.

There is no explosion-proof base in the present embodiment. The explosion-proof film 4 and the explosion-proof pressing ring 3 are overlapped and welded on the battery cover plate 1.

The safety vent cover 5 is welded on the explosion-proof pressing ring 3.

The free head of the explosion-proof pin 6 is flat and circular. The radius ratio of the free head of the explosion-proof pin 6 to the explosion-proof film 4 is about 1:7, and diamond particles of 200 mesh are disposed on the free head.

Other structures of Embodiment 2 are the same as those of Embodiment 1.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A battery safety vent, comprising: a film fixed on a battery cover plate;
   a safety vent cover covering the film and having a pressure release aperture; and a pin disposed at a top of the safety vent cover, wherein the pin includes a head, which is placed at a predetermined distance from the film and is blunt and points to the film,
   wherein the head of the pin has hard particles disposed thereon and have a mesh size ranging from 50 mesh to 500 mesh.

2. The battery safety vent of claim 1, further comprising a base fixed on the battery cover plate, wherein the film is fixed on the base.

3. The battery safety vent of claim 1, further comprising a pressing ring pressed at the edge of the film.

4. The battery safety vent of claim 1, wherein the head of the pin is flat and circular.

5. The battery safety vent of claim 1, wherein, the head of the pin is spherical.

6. The battery safety vent of claim 5, wherein the film is circular, and the radius ratio of the head of the in to the film ranges from about 1:7 to about 1:10.

7. The battery safety vent of claim 1, wherein the film is made from stainless steel.

8. The battery safety vent of claim 1, wherein the top of the safety vent cover is formed with an inserting hole and the pin is fixed in the inserting hole.

9. A battery, comprising: an electric core; a shell housing the electric core; a cover plate disposed on an end surface of the shell and formed with a gas release aperture; and a battery safety vent disposed on the cover plate and around the gas release aperture, wherein the battery safety vent comprises: a film fixed on the cover plate; a safety vent cover covering the film and having a pressure release aperture; and a pin disposed at a top of the safety vent cover, wherein a head of the pin, which is placed at a predetermined distance from the film, is blunt and points to the film, wherein the head of the in comprises hard particles having a mesh size ranging from 50 mesh to 500 mesh.

10. The battery safety vent of claim 9, further comprising a base fixed on the battery cover plate, wherein the film is fixed on the base.

11. The battery safety vent of claim 9, further comprising a pressing ring pressed at the edge of the film and fixed with the film.

12. The battery safety vent of claim 9, wherein the head of the pin is flat and circular.

13. The battery safety vent of claim 9, wherein, the head of the pin is spherical.

14. The battery safety vent of claim 13, wherein the film is circular, and the radius ratio of the head of the pin to the film ranges from about 1:7 to about 1:10.

15. The battery safety vent of claim 9, wherein the film is made from stainless steel.

16. The battery safety vent of claim 9, wherein the top of the safety vent cover is formed with an inserting hole and the pin is fixed in the inserting hole.

* * * * *

UNITED STATES PATENT AND TRADEMARK OFFICE
CERTIFICATE OF CORRECTION

PATENT NO. : 8,357,462 B2
APPLICATION NO. : 13/282647
DATED : January 22, 2013
INVENTOR(S) : Jianhua Zhu et al.

It is certified that error appears in the above-identified patent and that said Letters Patent is hereby corrected as shown below:

In claim 6, column 6, line 14, "in" should read as -- pin --.

In claim 9, column 6, line 30, "in" should read as -- pin --.

Signed and Sealed this
Nineteenth Day of March, 2013

Teresa Stanek Rea
*Acting Director of the United States Patent and Trademark Office*